United States Patent
Nguyen et al.

(10) Patent No.: US 6,877,560 B2
(45) Date of Patent: Apr. 12, 2005

(54) METHODS OF PREVENTING THE FLOW-BACK OF PARTICULATES DEPOSITED IN SUBTERRANEAN FORMATIONS

(75) Inventors: Philip D. Nguyen, Duncan, OK (US); Jimmie D. Weaver, Duncan, OK (US)

(73) Assignee: Halliburton Energy Services, Duncan, OK (US)

( * ) Notice: Subject to any disclaimer, the term of this patent is extended or adjusted under 35 U.S.C. 154(b) by 437 days.

(21) Appl. No.: 10/199,175

(22) Filed: Jul. 19, 2002

(65) Prior Publication Data

US 2004/0014608 A1 Jan. 22, 2004

(51) Int. Cl.$^7$ .......................................... E21B 43/267
(52) U.S. Cl. .................. 166/276; 166/280.1; 166/308.1
(58) Field of Search ............................. 166/276, 280.1, 166/280.2, 308.1, 308.2, 308.3, 308.5

(56) References Cited

U.S. PATENT DOCUMENTS

| | | | |
|---|---|---|---|
| 3,089,542 A | 5/1963 | Kolodny ....................... 166/42 |
| 3,155,159 A | 11/1964 | McGuire, Jr. et al. ........ 166/29 |
| 3,254,064 A | 5/1966 | Nevins ......................... 260/87 |
| 3,363,690 A | 1/1968 | Fischer ........................ 166/33 |
| 3,387,888 A | 6/1968 | Shock et al. .................... 299/4 |
| 3,481,401 A | 12/1969 | Graham ...................... 166/280 |
| 3,659,651 A | 5/1972 | Graham ...................... 166/280 |
| 3,677,941 A | 7/1972 | Mazzara et al. .......... 252/8.55 |
| 3,888,311 A | 6/1975 | Cooke, Jr. ................... 166/280 |
| 3,917,345 A | 11/1975 | Davidson et al. .............. 299/5 |
| 3,929,191 A | 12/1975 | Graham et al. ............. 166/276 |
| 3,998,744 A | 12/1976 | Arnold et al. ............. 252/8.55 |
| 4,049,866 A | 9/1977 | Lane et al. .................. 428/402 |
| 4,137,182 A | 1/1979 | Golinkin .................... 252/8.55 |
| 4,193,453 A | 3/1980 | Golinkin ...................... 166/295 |
| 4,518,039 A | 5/1985 | Graham et al. ............. 166/276 |
| 4,527,627 A | 7/1985 | Graham et al. ............. 166/280 |
| 4,531,594 A | 7/1985 | Cowan .......................... 175/72 |
| 4,664,619 A | 5/1987 | Johnson et al. ............. 431/154 |
| 4,664,819 A | 5/1987 | Glaze et al. ............. 252/8.551 |
| 4,779,680 A | 10/1988 | Sydansk ..................... 166/300 |
| 4,869,960 A | 9/1989 | Gibb et al. ................. 428/405 |
| 4,969,523 A | 11/1990 | Martin et al. ............... 166/278 |
| 5,180,020 A | 1/1993 | Fuh et al. ..................... 175/72 |
| 5,207,282 A | 5/1993 | Fuh et al. ..................... 175/72 |
| 5,251,697 A | 10/1993 | Shuler ........................ 166/268 |
| 5,330,005 A | 7/1994 | Card et al. .................. 166/280 |
| 5,381,864 A | 1/1995 | Nguyen et al. ............. 166/280 |
| 5,422,183 A | 6/1995 | Sinclair et al. ............. 428/403 |
| 5,439,055 A | 8/1995 | Card et al. .................. 166/280 |
| 5,439,059 A | 8/1995 | Harris et al. ................ 166/300 |
| 5,492,178 A | 2/1996 | Nguyen et al. ............. 166/276 |
| 5,501,274 A | 3/1996 | Nguyen et al. ............. 166/276 |
| 5,501,275 A | 3/1996 | Card et al. .................. 166/280 |
| 5,531,274 A | 7/1996 | Bienvenu, Jr. ............. 166/280 |
| 5,582,249 A | 12/1996 | Caveny et al. ............. 166/276 |
| 5,604,186 A | 2/1997 | Hunt et al. .................. 507/204 |
| 5,697,440 A | 12/1997 | Weaver et al. ............. 166/281 |
| 5,775,425 A | 7/1998 | Weaver et al. ............. 166/276 |
| 5,787,986 A | 8/1998 | Weaver et al. ............. 166/280 |
| 5,791,415 A | 8/1998 | Nguyen et al. ............. 166/280 |
| 5,833,000 A | 11/1998 | Weaver et al. ............. 166/276 |
| 5,839,048 A | 11/1998 | Kato ........................... 399/407 |
| 5,839,510 A | 11/1998 | Weaver et al. ............. 166/276 |
| 5,871,049 A | 2/1999 | Weaver et al. ............. 166/276 |
| 5,921,317 A | 7/1999 | Dewprashad et al. ....... 166/208 |
| 5,960,880 A | 10/1999 | Nguyen et al. ............. 166/280 |
| 5,964,295 A | 10/1999 | Brown et al. ............... 166/308 |
| 6,016,869 A | 1/2000 | Burts, Jr. .................... 166/295 |
| 6,016,870 A | 1/2000 | Dewprashad et al. ....... 166/295 |
| 6,047,772 A | 4/2000 | Weaver et al. ............. 166/276 |
| 6,059,034 A | 5/2000 | Rickards et al. ........... 166/280 |
| 6,209,643 B1 | 4/2001 | Nguyen et al. ............. 166/276 |
| 6,213,209 B1 | 4/2001 | Nguyen et al. ............. 166/276 |
| 6,257,335 B1 | 7/2001 | Nguyen et al. ............. 166/280 |
| 6,330,916 B1 | 12/2001 | Rickards et al. ........... 166/280 |
| 6,364,945 B1 | 4/2002 | Chaterji et al. ............. 106/677 |
| 6,406,789 B1 * | 6/2002 | McDaniel et al. .......... 428/402 |
| 6,582,819 B2 * | 6/2003 | McDaniel et al. .......... 428/402 |
| 6,632,527 B1 * | 10/2003 | McDaniel et al. .......... 428/402 |
| 2002/0048676 A1 * | 4/2002 | McDaniel et al. .......... 428/404 |

FOREIGN PATENT DOCUMENTS

| | | |
|---|---|---|
| EP | 0771935 A1 | 7/1997 |
| EP | 0853186 A2 | 7/1998 |
| EP | 0859125 A1 | 8/1998 |
| EP | 0879935 A2 | 11/1998 |
| EP | 0933498 A1 | 8/1999 |
| GB | 994377 | 6/1965 |
| GB | 2319796 | 6/1998 |
| WO | 96/04464 | 2/1996 |
| WO | 99/27229 | 6/1999 |

* cited by examiner

*Primary Examiner*—William Neuder
(74) *Attorney, Agent, or Firm*—Robert A. Kent; C. Clark Dougherty, Jr.

(57) ABSTRACT

Improved methods of preventing the flow-back of particulates deposited in subterranean formations with produced formation fluids are provided. The methods include extruding or injecting a solution or mixture of a particulate solid polymer through a plurality of small diameter ports into an aqueous carrier fluid containing suspended particulate material whereby polymer fibers and strands are formed in the carrier fluid. The polymer fibers and strands mix with the particulate material suspended in the carrier fluid as the carrier fluid is pumped into the subterranean formation. The mixture of the particulate material and the polymer fibers and strands is deposited in the subterranean formation so that the mixture forms at least one permeable pack that prevents the production of formation fines with fluids produced from the formation and prevents the flow-back of the deposited particulate solids, fibers or strands.

64 Claims, No Drawings

METHODS OF PREVENTING THE FLOW-BACK OF PARTICULATES DEPOSITED IN SUBTERRANEAN FORMATIONS

BACKGROUND OF THE INVENTION

1. Field of the Invention

The present invention relates to improved methods of consolidating particulate material in subterranean formations whereby the flow-back of the particulate material is prevented.

2. Description of the Prior Art

Hydrocarbon producing subterranean formations penetrated by well bores are often treated by forming gravel packs of solid particles adjacent to the subterranean formation and/or by fracturing the subterranean formation and depositing proppant particle packs in the fractures.

In gravel packing operations, particulate material such as graded sand referred to in the art as "gravel" is suspended in a carrier fluid at the surface and placed in a subterranean formation in a manner whereby a gravel pack is formed in the formation. The gravel pack produced functions as a filter to separate formation sand and solid fines from produced fluids while permitting the produced fluids to flow into and through the well bore penetrating the subterranean formation.

Another subterranean formation treatment is hydraulic fracturing. In hydraulic fracturing, a viscous treating fluid, referred to in the art as a fracturing fluid, is pumped through a well bore into a subterranean formation or zone to be stimulated at a rate and pressure such that fractures are formed and extended in the subterranean formation or zone. The viscous fracturing fluid includes particulate material such as graded sand (often referred to as proppant particles) suspended therein which is carried into the fractures. The proppant particles are deposited in the fractures when the viscous fracturing fluid is broken (reduced to a thin fluid) and recovered. The proppant particles form packs which function to prevent the formed fractures from closing. The proppant particle packs maintain the fractures open and form conductive channels through which produced fluids can flow to the well bore.

A problem often experienced in the use of propped fractures is that as the formations are produced, the proppant particles flow-back with the formation fluids. The flow-back of the proppant particles with formation fluids is very detrimental in that the resulting solids in the produced fluids erode metal goods, plug piping and vessels and cause damage to valves, instruments and other production equipment.

Thus, there are continuing needs for improved methods of treating subterranean formations utilizing particulate material whereby the flow-back of the particulate material does not occur.

SUMMARY OF THE INVENTION

The present invention provides improved methods of treating subterranean formations using particulate material and polymer fibers and strands which meet the needs described above and overcome the deficiencies of the prior art. A method of this invention is basically comprised of the following steps. A solution or mixture of a particulate solid polymer dissolved in a water soluble solvent or mixed with a volatile liquid is provided. An aqueous carrier fluid containing suspended particulate material is pumped through a well bore into a subterranean formation. The solution or mixture containing the dissolved or mixed polymer is injected or extruded through a plurality of small diameter ports into the aqueous carrier fluid being pumped whereby polymer fibers and strands are formed in the carrier fluid and are mixed with the particulate material suspended in the carrier fluid as the carrier fluid is pumped through the well bore. The resulting mixture of particulate material and polymer fibers and strands is deposited in the subterranean formation so that the mixture forms at least one permeable pack that prevents the flow-back of the deposited particulate solids, fibers or strands.

The mixture of particulate material and polymer fibers and strands which is deposited in the subterranean formation is maintained in the subterranean formation by the fibrous network formed within the proppant packs and by the closure pressure of fractures formed in the formation. The polymer fibers and strands mixed with the particulate material function to maintain the particulate material in place during the production of formation fluids through the permeable pack or packs of particulate material and polymer fibers and strands. In order to increase the stability and strength of the permeable pack or packs formed, the polymer fibers and strands or the particulate material can be coated with a hardenable resin composition or a tackifying agent.

The objects, features and advantages of the present invention will be readily apparent to those skilled in the art upon a reading of the description of preferred embodiments which follows.

DESCRIPTION OF PREFERRED EMBODIMENTS

By the present invention, improved methods of treating subterranean formations using particulate material and polymer fibers and strands are provided. A method of the invention basically comprises the following steps. A solution or mixture of a particulate solid polymer dissolved in a water soluble solvent or mixed with a volatile liquid is provided. An aqueous carrier fluid containing suspended particulate material is pumped through a well bore and into a subterranean formation penetrated by the well bore. The solution or mixture of the particulate solid polymer is injected or extruded through a plurality of small diameter ports into the aqueous carrier fluid containing suspended particulate material whereby polymer fibers and strands are formed in the carrier fluid and are mixed with the particulate material as the carrier fluid is pumped through the well bore. The mixture of the particulate material and the fibers and strands is deposited in the subterranean formation so that the mixture forms at least one permeable pack that prevents the flow-back of the deposited particulate solids, fibers or strands.

A variety of particulate solid polymers can be utilized for forming the polymer fibers and strands that are mixed with the particulate material in the aqueous carrier fluid. Examples of such particulate solid polymers include, but are not limited to, polycarbonate, amids, acrylic, alkyds, allylics, polyolefins, polyimide, polysulfone, polyetherimide, polyamide, polyacrylonitrile, acrylonitrile butadiene styrene, cellulose acetate, cellulose acetate butyrate, polyisoprene rubber, ethylene propylene rubber, butyl rubber, halobutyl rubber, nitrile rubber, polybutadiene rubber, polystyrene butadiene rubber and mixtures thereof.

Of the foregoing particulate solid polymers those that can be dissolved in a water soluble liquid include polypropylene, polyamide, polyacrylonitrile, polycarbonate, polyetherimide, polyisoprene rubber, ethylene propylene rubber, butyl rubber, halobutyl rubber, nitrile rubber, polybutadiene rubber and polystyrene butadiene rubber. Those that can be mixed with a volatile liquid are cellulose acetate, cellulose acetate butyrate, polypropylene, polyisoprene rubber, ethylene propylene rubber, butyl rubber, halobutyl rubber, nitrile rubber, polybutadiene rubber and polystyrene butadiene rubber.

The water soluble liquids that can be utilized for dissolving particulate solid polymers include, but are not limited to, ketones, ethers, aromatics, alcohols, methylethyl ketone, N-methylpyrrolidone, dimethylacetamide, dimethyl formamide, chloroform, methylene and mixtures thereof. The volatile liquids which can be utilized include, but are not limited to, acetone, methanol, methylethyl ketone, chloroform, tetrahydrofurfuryl alcohol and mixtures thereof.

As will be understood by those skilled in the art, when a particulate solid polymer is dissolved in a water soluble solvent and the solution is injected through a plurality of small diameter ports, the water soluble solvent is extracted by the aqueous carrier fluid as the solution is injected thereby forming polymer fibers and strands in the aqueous carrier fluid. When a mixture of a particulate solid polymer with a volatile liquid is extruded through a plurality of small diameter ports into the aqueous carrier fluid, the volatile liquid is evaporated and the polymer fibers and strands are formed in the carrier fluid. Preferably, an acrylonitrile particulate solid polymer is dissolved in a dimethyl formamide water soluble solvent and injected through the plurality of small diameter ports into the aqueous carrier fluid.

The particulate polymer utilized is dissolved or mixed in a water soluble or volatile liquid in an amount in the range of from about 1% to about 75% by weight of the resulting solution or mixture. The polymer fibers and strands formed in the carrier fluid or fracturing fluid are preferably present therein in an amount in the range of from about 0.1% to about 5% by weight of the particulate material in the carrier fluid or fracturing fluid, more preferably in an amount of about 2%.

While various carrier fluids can be utilized in accordance with this invention, an aqueous gelled liquid is preferred. The water utilized in the aqueous gelled liquid can be fresh water or salt water. The term "salt water" is used herein to mean unsaturated salt solutions and saturated salt solutions including brines and seawater.

A variety of gelling agents can be included in the carrier fluid to increase the viscosity thereof and suspend the solid particles and the polymer fibers and strands therein. The gelling agents can be natural and derivatized polysaccharides which are soluble, dispersible or swellable in an aqueous liquid to yield viscosity to the liquid. One group, for example, of polysaccharides which are suitable for use in accordance with the present invention includes galactomannan gums such as guar gum and the like. Modified gums such as carboxyalkyl and hydroxyalkyl derivatives like carboxymethyl guar and hydroxypropyl guar can also be employed. Doubly derivatized gums such as carboxymethylhydroxypropyl guar can also be used. Modified celluloses and derivatives thereof are also suitable for use. Examples of water-soluble cellulose ethers which can be used include, but are not limited to, carboxyethyl cellulose, carboxymethyl cellulose, carboxymethylhydroxyethyl cellulose, hydroxyethyl cellulose, hydroxypropyl cellulose and the like.

The gelling agent utilized in the aqueous carrier fluid is generally present in an amount in the range of from about 0.1% to about 1.2% by weight of the carrier fluid, more preferably in an amount of about 1%.

In order to further enhance the development of the viscosity of the carrier fluid, the gelling agent used can be cross-linked by the addition of a cross-linking agent to the aqueous carrier fluid. The cross-linking agent can comprise a borate releasing compound or any of the well known transition metal ions which are capable of creating a cross-linked structure with the particular gelling agent utilized. Preferred cross-linking agents for use with the above described gelling agents include, but are not limited to, borate releasing compounds, a source of titanium ions, a source of zirconium ions, a source of antimony ions and a source of aluminum ions. When used, a cross-linking agent of the above types is included in the aqueous treating fluid in a general amount in the range of from about 0.1% to about 1.5% by weight of the gelling agent therein, more preferably in an amount of about 1%.

The particulate material suspended in the carrier fluid can include, but is not limited to, graded sand, bauxite, ceramic materials, glass materials, walnut hulls and polymer beads. Of these, graded sand is preferred. The particulate material is generally included in the carrier fluid in an amount in the range of from about 0.5 pounds per gallon to about 32 pounds per gallon.

In order to recover the gelled aqueous carrier fluid from a subterranean formation, e.g., to recover a fracturing fluid from formed fractures in a subterranean formation, a delayed breaker for the gelling agent or cross-linked gelling agent is included in the aqueous carrier fluid. The delayed breaker is included in the aqueous carrier fluid or fracturing fluid in an amount sufficient to effect a controlled reduction in the viscosity of the carrier fluid or fracturing fluid after a desired period of time. Suitable delayed breakers which can be utilized include, but are not limited to, alkali metal and ammonium persulfates which are delayed by being encapsulated in a material which slowly releases the breaker or by a breaker selected from the group consisting of alkali metal chlorites and hypochlorites and calcium hypochlorite.

The optimum or effective amount of breaker employed depends on various factors including the subterranean zone temperature, the particular gelling agent and its concentration, the breaker utilized and various other factors. However, encapsulated persulfate breakers are typically included in the aqueous carrier fluid or fracturing fluid in an amount in the range of from about 1% to about 5% by weight of the gelling agent therein. When used, the chlorite breakers are included in the aqueous carrier fluid or fracturing fluid in an amount in the range of from about 1% to about 5% by weight of gelling agent therein.

In order to strengthen the permeable packs formed by the particulate material and polymer fibers and strands, the particulate solid polymer utilized for forming the polymer fibers and strands can be selected based on the temperature of the treated subterranean formation so that the fibers and strands formed therefrom are softened and stick to the particulate material, i.e., the particulate material embeds in or otherwise adheres to the polymer fibers and strands. For example, if the temperature of the treated formation is 180° F., a polypropylene polymer can be used which will produce fibers and strands that soften at that temperature.

In an alternate technique, the suspended particulate material in the aqueous carrier fluid or fracturing fluid can be coated with a non-hardening tackifying compound. For example, the non-hardening tackifying compound can be mixed with the carrier fluid or fracturing fluid containing the suspended particulate material whereby the particulate material is coated with the tackifying compound. Examples of non-hardening tackifying compounds which can be utilized include, but are not limited to, polyamides, polyesters, polyethers, polycarbamates, polycarbonates, styrene-butadiene lattices and natural and synthetic resins. When used, the non-hardening tackifying compound is mixed with the carrier fluid or fracturing fluid in an amount in the range of from about 0.1% to about 5% by weight of suspended particulate material in the carrier fluid or fracturing fluid.

Another alternate technique for strengthening the permeable pack comprised of particulate material and polymer fibers and strands is to coat the particulate material in the carrier fluid or fracturing fluid with a hardenable resin composition. The hardenable resin composition used can be coated directly onto dry particulate material or mixed with the carrier fluid or fracturing fluid whereby the particulate material is coated with the hardenable resin composition. The hardenable resin composition used can include a delayed hardening agent or other known technique can be used for causing the resin to harden in the subterranean formation. Examples of hardenable resin compositions which can be utilized include, but are not limited to, bisphenol A-epichlorohydrin resin, polyepoxide resin, novolac resin, polyester resin, phenol-aldehyde resin, urea-aldehyde resin, glycidyl ethers and mixtures thereof. When used, the hardenable resin composition is combined with the carrier fluid or fracturing fluid in an amount in the range of form about 0.5% to about 5% by weight of particulate material therein.

In yet another alternate technique, a non-hardening tackifying compound or a hardenable resin composition can be combined with the polymer solution or mixture that forms the polymer fibers and strands whereby the fibers and strands are coated with the non-hardening tackifying compound or the hardenable resin composition as they are formed. The non-hardening tackifying compounds or the hardenable resin compositions described above can be utilized. When used, the non-hardening tackifying compound or hardenable resin composition is mixed with the solution or mixture of the particulate solid polymer in an amount in the range of from about 0.1% to about 5% by weight of the particulate solid polymer therein.

The proppant particles utilized in accordance with the present invention are generally of a size such that formation particulate solids which migrate with produced fluids are prevented from being produced from the subterranean zone. Generally, the proppant particles have a size in the range of from about 2 to about 400 mesh, U.S. Sieve Series. The preferred proppant material is graded sand having a particle size in the range of from about 10 to about 70 mesh, U.S. Sieve Series. Preferred sand particle size distribution ranges are one or more of 10–20 mesh, 20–40 mesh, 40–60 mesh or 50–70 mesh, depending on the particular size and distribution of the formation solids to be screened out by the consolidated proppant particles.

As will be understood by those skilled in the art, when a fracturing fluid is broken and the particulate proppant material and polymer fibers and strands are deposited in the fractures formed, the fractures close on the proppant material and polymer fibers and strands. The partially closed fractures apply pressure on the particulate proppant material and polymer fibers and strands whereby the particulate proppant particles and polymer fibers and strands are forced into contact with each other. The pressure helps bring about the consolidation of the proppant particles and polymer fibers and strands into permeable packs having sufficient compressive strengths to prevent unconsolidated proppant material, fibers and strands and formation sand and fines from flowing out of the fractures with produced fluids. When a non-hardening tackifying agent or hardenable resin composition is coated on the proppant particles or polymer fibers and strands, or both, the resulting permeable pack has increased compressive strength.

A preferred method of treating a subterranean formation penetrated by a well bore comprises the steps of: (a) providing a solution or mixture of a particulate solid polymer dissolved in or mixed with a water soluble or volatile liquid; (b) pumping an aqueous carrier fluid containing suspended particulate material through the well bore into the subterranean formation; (c) injecting or extruding the solution or mixture provided in accordance with step (a) through a plurality of small diameter ports into the aqueous carrier fluid pumped in accordance with step (b) whereby polymer fibers and strands are formed in the carrier fluid and are mixed with the particulate material suspended therein as the carrier fluid is pumped through the well bore; and (d) depositing the mixture of the particulate material and the fibers and strands formed in step (c) in the subterranean formation so that the mixture forms at least one permeable pack that prevents the flow-back of the deposited particulate solids, fibers or strands.

A preferred method of fracturing a subterranean formation penetrated by a well bore comprises the steps of: (a) providing a solution of a particulate solid polymer dissolved in a water soluble liquid, the polymer being present in the solution in an amount in the range of from about 1% to about 75% by weight of the solution; (b) pumping a viscous aqueous fracturing fluid containing suspended particulate proppant material through the well bore into fractures formed in the subterranean formation; (c) injecting the solution provided in accordance with step (a) through a plurality of small diameter ports into the viscous fracturing fluid pumped in accordance with step (b) whereby polymer fibers and strands are formed in the fracturing fluid and are mixed with the particulate proppant material suspended therein as the fracturing fluid is pumped through the well bore, the polymer fibers and strands being formed in the fracturing fluid in an amount in the range of from about 0.1% to about 10% by weight of the particulate proppant material therein; and (d) depositing the mixture of the particulate proppant material and the polymer fibers and strands in the fractures in the subterranean formation so that the mixture forms permeable packs in the fractures that prevent the production of formation sand and fines with fluids produced from the formation and prevent the flow-back of the deposited particulate proppant material, fibers or strands.

Another method of the present invention for fracturing a subterranean formation penetrated by a well bore comprises the steps of: (a) providing a mixture of a particulate solid polymer mixed with a volatile liquid, the polymer being present in the mixture in an amount in the range of from about 1% to about 75% by weight of the mixture; (b) pumping a viscous aqueous fracturing fluid containing suspended particulate proppant material through the well bore into fractures formed in the subterranean formation; (c) extruding the mixture provided in accordance with step (a) through a plurality of small diameter ports into the viscous fracturing fluid pumped in accordance with step (b) whereby polymer fibers and strands are formed in the fracturing fluid and are mixed with the particulate proppant material suspended therein as the fracturing fluid is pumped through the well bore, the polymer fibers and strands being formed in the fracturing fluid in an amount in the range of from about 0.1% to about 10% by weight of the particulate proppant material therein; and (d) depositing the mixture of the particulate proppant material and the polymer fibers and strands in the fractures in the subterranean formation so that the mixture forms permeable packs in the fractures that prevent the production of formation sand and fines with fluids produced from the formation and prevent the flow-back of the deposited particulate proppant material, fibers or strands.

In order to further illustrate the methods of the present invention, the following examples are given.

EXAMPLE 1

20 grams of acrylonitrile yarn was dissolved in 80 milliliters of dimethyl formamide. A volume of this polymer solution was transferred into a 25 milliliter plastic syringe. Various sizes of needles ranging from 16 to 22-gauge were attached to the syringe. The polymer solution was injected from the syringe via the needle into a beaker containing water. The beaker had a magnetic stirring rod at the bottom to allow its content to be stirred while the polymer solution was being injected at a constant rate into the water. Upon entering the water, the solid polymer strand was instantly formed as it flowed along with the vortex streamlines. The use of a 16-gauge needle resulted in fiber strands with the largest diameter, whereas the 22-gauge provided the finest fiber strands.

EXAMPLE 2

Example 1 was repeated with the exception that a sand slurry with a concentration of 7 pounds of sand per gallon of uncross-linked carboxymethylhydroxypropyl guar fracturing fluid was placed in the beaker instead of water. Similarly, the contents of the beaker were vigorously stirred as the polymer solution was being injected into the vortex of the slurry. Both long and short segments of fiber strands were instantly formed within the streamlines of the stirring slurry.

Thus, the present invention is well adapted to attain the objects and advantages mentioned as well as those which are inherent therein. While numerous changes may be made by those skilled in the art, such changes are encompassed within the spirit of this invention as defined by the appended claims.

What is claimed is:

1. A method of treating a subterranean formation penetrated by a well bore comprising the steps of:
   (a) providing a solution or mixture of a particulate solid polymer dissolved in or mixed with a water soluble or volatile liquid;
   (b) pumping an aqueous carrier fluid containing suspended particulate material through said well bore into said subterranean formation;
   (c) injecting or extruding said solution or mixture provided in accordance with step (a) through a plurality of small diameter ports into said aqueous carrier fluid pumped in accordance with step (b) whereby polymer fibers and strands are formed in said carrier fluid and are mixed with said particulate material suspended therein as said carrier fluid is pumped through said well bore; and
   (d) depositing the mixture of said particulate material and said fibers and strands formed in step (c) in said subterranean formation so that said mixture forms at least one permeable pack that prevents the production of formation sand and fines with fluids produced from said formation and prevents the flow-back of the deposited particulate solids, fibers or strands.

2. The method of claim 1 wherein said particulate solid polymer comprises at least one member selected from the group consisting of polycarbonate, amids, acrylic, alkyds, allylics, polyolefins, polyimide, polysulfone, polyetherimide, polyamide, polyacrylonitrile, acrylonitrile butadiene styrene, cellulose acetate, cellulose acetate butyrate, polyisoprene rubber, ethylene propylene rubber, butyl rubber, halobutyl rubber, nitrile rubber, polybutadiene rubber, polystyrene butadiene rubber and mixtures thereof.

3. The method of claim 1 wherein said water soluble or volatile liquid comprises at least one member selected from the group consisting of ketones, ethers, aromatics, alcohols, methyl ethyl ketone, N-methylpyrrolidone, dimethylacetamide, dimethyl formamide, chloroform, acetone, methylene chloride, methanol tetrahydrofurfuryl alcohol and mixtures thereof.

4. The method of claim 1 wherein said aqueous carrier fluid is comprised of water and a gelling agent.

5. The method of claim 4 wherein said water is selected from the group consisting of fresh water and salt water.

6. The method of claim 4 wherein said gelling agent comprises at least one member selected from the group consisting of galactomannan gums and derivatives thereof and celluloses and derivatives thereof.

7. The method of claim 6 wherein said gelling agent comprises a galactomannan gum selected from the group consisting of guar, hydroxypropylguar and carboxymethylhydroxypropyl guar.

8. The method of claim 6 wherein said gelling agent comprises a cellulose derivative selected from the group consisting of hydroxyethylcellulose, carboxymethylhydroxyethylcellulose, carboxymethylcellulose and hydroxyethylcellulose grafted with vinyl phosphonic acid.

9. The method of claim 4 wherein said aqueous carrier fluid further comprises a cross-linking agent for cross-linking said gelling agent therein.

10. The method of claim 9 wherein said cross-linking agent is selected from the group consisting of borate releasing compounds, a source of titanium ions, a source of zirconium ions and a source of aluminum ions.

11. The method of claim 1 wherein said suspended particulate material in said carrier fluid comprises at least one member selected from the group consisting of graded sand, bauxite, ceramic materials, glass materials, walnut hulls and polymer beads.

12. The method of claim 4 wherein said aqueous carrier fluid further comprises a delayed breaker to effect a controlled reduction in the viscosity of said aqueous carrier fluid after a period of time within said subterranean formation.

13. The method of claim 12 wherein said delayed breaker comprises at least one member selected from the group consisting of encapsulated alkali metal and ammonium persulfates and alkali metal chlorites and hypochlorites and calcium hypochlorite.

14. The method of claim 9 wherein said aqueous carrier fluid further comprises a delayed breaker to effect a controlled reduction in the viscosity of said aqueous carrier fluid after a period of time within said subterranean formation.

15. The method of claim 14 wherein said delayed breaker comprises at least one member selected from the group consisting of encapsulated alkali metal and ammonium persulfates and alkali metal chlorites and hypochlorites and calcium hypochlorite.

16. The method of claim 1 wherein said particulate solid polymer provided in accordance with step (a) is selected so that the fibers and strands formed therefrom are softened at the temperature of said subterranean formation whereby said particulate material embeds in or otherwise adheres to said fibers and strands.

17. The method of claim 1 wherein said suspended particulate material in said carrier fluid is coated with a non-hardening tackifying compound.

18. The method of claim 17 wherein said non-hardening tackifying compound comprises at least one member selected from the group consisting of polyamides, polyesters, polyethers, polycarbamates, polycarbonates, styrene-butadiene lattices and natural and synthetic resins.

19. The method of claim 1 wherein said suspended particulate mixture in said carrier fluid is coated with a hardenable resin composition.

20. The method of claim 19 wherein said hardenable resin composition comprises at least one member selected from the group consisting of bisphenol A-epichlorohydrin resin, polyepoxide resin, novolak resin, polyester resin, phenol-aldehyde resin, urea-aldehyde resin, glycidyl ethers and mixtures thereof.

21. The method of claim 1 wherein a non-hardening tackifying compound is combined with said polymer solution or mixture of step (a) whereby said fibers and strands formed therefrom are coated with said tackifying compound.

22. The method of claim 21 wherein said non-hardening tackifying compound comprises at least one member selected from the group consisting of polyamides, polyesters, polyethers, polycarbamates, polycarbonates, styrene-butadiene lattices and natural and synthetic resins.

23. The method of claim 1 wherein a hardenable resin composition is combined with said solution or mixture of step (a) whereby said fibers and strands formed therefrom are coated with said hardenable resin composition.

24. The method of claim 23 wherein said hardenable resin composition comprises at least one member selected from the group consisting of bisphenol A-epichlorohydrin resin, polyepoxide resin, novolak resin, polyester resin, phenola-ldehyde resin, urea-aldehyde resin, glycidyl ethers and mixtures thereof.

25. A method of fracturing a subterranean formation penetrated by a well bore comprising the steps of:
  (a) providing a solution of a particulate solid polymer dissolved in a water soluble liquid, said polymer being present in said solution in an amount in the range of from about 1% to about 75% by weight of said solution;
  (b) pumping a viscous aqueous fracturing fluid containing suspended particulate proppant material through said well bore into fractures formed in said subterranean formation;
  (c) injecting said solution provided in accordance with step (a) through a plurality of small diameter ports into said viscous fracturing fluid pumped in accordance with step (b) whereby polymer fibers and strands are formed in said fracturing fluid and are mixed with said particulate proppant material suspended therein as said fracturing fluid is pumped through said well bore, said polymer fibers and strands being formed in said fracturing fluid in an amount in the range of from about 0.1% to about 10% by weight of said particulate proppant material therein; and
  (d) depositing the mixture of said particulate proppant material and said polymer fibers and strands in said fractures in said subterranean formation so that said mixture forms permeable packs in said fractures that prevent the production of formation sand and fines with fluids produced from said formation and prevents the flow-back of the deposited particulate proppant material, fibers or strands.

26. The method of claim 25 wherein said particulate solid polymer is acrylonitrile.

27. The method of claim 25 wherein said water soluble liquid is dimethyl formamide.

28. The method of claim 25 wherein said viscous aqueous fracturing fluid is comprised of water and a gelling agent.

29. The method of claim 28 wherein said water is selected from the group consisting of fresh water and salt water.

30. The method of claim 28 wherein said gelling agent is selected from the group consisting of guar and its derivatives.

31. The method of claim 25 wherein said viscous aqueous fracturing fluid further comprises a cross-linking agent for cross-linking said gelling agent therein.

32. The method of claim 31 wherein said cross-linking agent is selected from the group consisting of borate releasing compounds, titanium ions, zirconium ions, antimony ions and aluminum ions.

33. The method of claim 25 wherein said suspended particulate proppant material is graded sand.

34. The method of claim 25 wherein said viscous aqueous fracturing fluid further comprises a delayed breaker to effect a controlled reduction in the viscosity of said viscous aqueous fracturing fluid after a period of time in said subterranean formation.

35. The method of claim 34 wherein said delayed breaker is selected from the group consisting of alkali metal and ammonium persulfates, alkali metal chlorites and hypochlorites and calcium chlorites.

36. The method of claim 25 wherein said particulate solid polymer provided in accordance with step (a) is selected so that the fibers and strands formed therefrom are softened at the temperature of said subterranean formation whereby said particulate material embeds in or otherwise adheres to said fibers and strands.

37. The method of claim 25 wherein said suspended particulate material in said carrier fluid is coated with a non-hardening tackifying compound.

38. The method of claim 37 wherein said non-hardening tackifying compound comprises at least one member selected from the group consisting of polyamides, polyesters, polyethers, polycarbamates, polycarbonates, styrene-butadiene lattices and natural and synthetic resins.

39. The method of claim 25 wherein said suspended particulate mixture in said carrier fluid is coated with a hardenable resin composition.

40. The method of claim 39 wherein said hardenable resin composition comprises at least one member selected from the group consisting of bisphenol A-epichlorohydrin resin, polyepoxide resin, novolak resin, polyester resin, phenol-aldehyde resin, urea-aldehyde resin, glycidyl ethers and mixtures thereof.

41. The method of claim 25 wherein a non-hardening tackifying compound is combined with said solution of step (a) whereby said fibers and strands formed therefrom are coated with said tackifying compound.

42. The method of claim 41 wherein said non-hardening tackifying compound comprises at least one member selected from the group consisting of polyamides, polyesters, polyethers, polycarbamates, polycarbonates, styrene-butadiene lattices and natural and synthetic resins.

43. The method of claim 25 wherein a hardenable resin composition is combined with said solution of step (a) whereby said fibers and strands formed therefrom are coated with said hardenable resin composition.

44. The method of claim 43 wherein said hardenable resin composition comprises at least one member selected from the group consisting of bisphenol A-epichlorohydrin resin, polyepoxide resin, novolak resin, polyester resin, phenolaldehyde resin, urea-aldehyde resin, glycidyl ethers and mixtures thereof.

45. A method of fracturing a subterranean formation penetrated by a well bore comprising the steps of:
  (a) providing a mixture of a particulate solid polymer with a volatile liquid, said polymer being present in said mixture in an amount in the range of from about 1% to about 75% by weight of said mixture;
  (b) pumping a viscous aqueous fracturing fluid containing suspended particulate proppant material through said well bore into fractures formed in said subterranean formation;
  (c) extruding said mixture provided in accordance with step (a) through a plurality of small diameter ports into said viscous fracturing fluid pumped in accordance with step (b) whereby polymer fibers and strands are formed in said fracturing fluid and are mixed with said particulate proppant material suspended therein as said fracturing fluid is pumped through said well bore, said polymer fibers and strands being formed in said fracturing fluid in an amount in the range of from about 0.1% to about 10% by weight of said particulate proppant material therein; and
  (d) depositing the mixture of said particulate proppant material and said polymer fibers and strands in said fractures in said subterranean formation so that said mixture forms permeable packs in said fractures that prevent the production of formation sand and fines with fluids produced from said formation and prevents the flow-back of the deposited particulate proppant material, fibers or strands.

46. The method of claim 45 wherein said particulate solid polymer is cellulose acetate.

47. The method of claim 45 wherein said volatile liquid is methylethyl ketone.

48. The method of claim 45 wherein said viscous aqueous fracturing fluid is comprised of water and a gelling agent.

49. The method of claim 48 wherein said water is selected from the group consisting of fresh water and salt water.

50. The method of claim 48 wherein said gelling agent is selected from the group consisting of guar and its derivatives.

51. The method of claim 45 wherein said viscous aqueous fracturing fluid further comprises a cross-linking agent for cross-linking said gelling agent therein.

52. The method of claim 51 wherein said cross-linking agent is selected from the group consisting of borate releasing compounds, titanium ions, zirconium ions, antimony ions and aluminum ions.

53. The method of claim 45 wherein said suspended particulate proppant material is graded sand.

54. The method of claim 45 wherein said viscous aqueous fracturing fluid further comprises a delayed breaker to effect a controlled reduction in the viscosity of said viscous aqueous fracturing fluid after a period of time in said subterranean formation.

55. The method of claim 54 wherein said delayed breaker is selected from the group consisting of alkali metal and ammonium persulfates, alkali metal chlorites and hypochlorites and calcium chlorites.

56. The method of claim 45 wherein said particulate solid polymer provided in accordance with step (a) is selected so that the fibers and strands formed therefrom are softened at the temperature of said subterranean formation whereby said particulate material embeds in or otherwise adheres to said fibers and strands.

57. The method of claim 45 wherein said suspended particulate material in said carrier fluid is coated with a non-hardening tackifying compound.

58. The method of claim 57 wherein said non-hardening tackifying compound comprises at least one member selected from the group consisting of polyamides, polyesters, polyethers, polycarbamates, polycarbonates, styrene-butadiene lattices and natural and synthetic resins.

59. The method of claim 45 wherein said suspended particulate mixture in said fracturing fluid is coated with a hardenable resin composition.

60. The method of claim 59 wherein said hardenable resin composition comprises at least one member selected from the group consisting of bisphenol A-epichlorohydrin resin, polyepoxide resin, novolak resin, polyester resin, phenol-aldehyde resin, urea-aldehyde resin, glycidyl ethers and mixtures thereof.

61. The method of claim 45 wherein a non-hardening tackifying compound is combined with said mixture of step (a) whereby said fibers and strands formed therefrom are coated with said tackifying compound.

62. The method of claim 61 wherein said non-hardening tackifying compound comprises at least one member selected from the group consisting of polyamides, polyesters, polyethers, polycarbamates, polycarbonates, styrene-butadiene lattices and natural and synthetic resins.

63. The method of claim 45 wherein a hardenable resin composition is combined with said mixture of step (a) whereby said fibers and strands formed therefrom are coated with said hardenable resin composition.

64. The method of claim 63 wherein said hardenable resin composition comprises at least one member selected from the group consisting of bisphenol A-epichlorohydrin resin, polyepoxide resin, novolak resin, polyester resin, phenol-aldehyde resin, urea-aldehyde resin, glycidyl ethers and mixtures thereof.

* * * * *